United States Patent
Yoon et al.

(10) Patent No.: US 8,150,570 B2
(45) Date of Patent: Apr. 3, 2012

(54) AUTO MANAGEMENT SYSTEM FOR AIR FILTER USED IN BATTERY PACK AND AUTO MANAGEMENT METHOD FOR THE SAME

(75) Inventors: Yeo Won Yoon, Daejeon (KR); Ji Sang Yu, Daejeon (KR)

(73) Assignee: LG Chem, Ltd. (KR)

( * ) Notice: Subject to any disclaimer, the term of this patent is extended or adjusted under 35 U.S.C. 154(b) by 596 days.

(21) Appl. No.: 11/814,387

(22) PCT Filed: Feb. 13, 2006

(86) PCT No.: PCT/KR2006/000498
§ 371 (c)(1),
(2), (4) Date: Jul. 20, 2007

(87) PCT Pub. No.: WO2006/085730
PCT Pub. Date: Aug. 17, 2006

(65) Prior Publication Data
US 2009/0234532 A1 Sep. 17, 2009

(51) Int. Cl.
*B60L 11/00* (2006.01)
*H02J 7/04* (2006.01)
(52) U.S. Cl. .......................... 701/22; 320/154; 320/152
(58) Field of Classification Search .................... 701/30, 701/22; 320/150–154; 903/903, 907, 908, 903/952; 429/71, 61, 62, 82, 120
See application file for complete search history.

(56) References Cited

U.S. PATENT DOCUMENTS

| | | | |
|---|---|---|---|
| 6,596,434 B1 * | 7/2003 | Yoshinaka et al. | 429/94 |
| 2002/0197527 A1 * | 12/2002 | Moores et al. | 429/120 |
| 2003/0101716 A1 * | 6/2003 | Hirooka et al. | 60/289 |
| 2003/0102871 A1 * | 6/2003 | Yudahira | 324/434 |
| 2003/0178970 A1 * | 9/2003 | Minamiura et al. | 320/116 |
| 2004/0261377 A1 | 12/2004 | Sung | |

FOREIGN PATENT DOCUMENTS

| | | |
|---|---|---|
| EP | 1406048 A2 | 4/2004 |
| FR | 2745422 A1 | 8/1997 |
| JP | 07061245 A | 3/1995 |

(Continued)

OTHER PUBLICATIONS

International Search Report; PCT/KR2006/000498; May 11, 2006.

(Continued)

*Primary Examiner* — James Trammell
*Assistant Examiner* — Muhammad Shafi
(74) *Attorney, Agent, or Firm* — Cantor Colburn LLP

(57) ABSTRACT

An auto management system for an air filter used in a battery pack comprises at least one cell and a case accommodating each of the cells so that there is secured an air flow passage between the neighboring cells. The battery pack is provided with an air inlet at one side and an air outlet on the other side and comprises an air filter detachably mounted at an outside end of the air inlet of the case; a blowing fan provided to one of the air inlet and the air outlet; a flux sensor; a control unit connected to the cells of the battery pack, the blowing fan and the flux sensor, respectively, measuring currents, voltages and temperatures of the respective cells and electrically controlling the blowing fan and the flux sensor.

8 Claims, 2 Drawing Sheets

FOREIGN PATENT DOCUMENTS

| | | |
|---|---|---|
| JP | 11089009 | 3/1999 |
| JP | 2002184435 | 6/2002 |
| JP | 2004048981 | 2/2004 |
| JP | 2004291721 | 10/2004 |
| KR | 1019980019836 | 6/1998 |
| KR | 1019980040290 | 8/1998 |
| KR | 2003-0026458 * | 4/2003 |
| SU | 864390 A1 | 4/1978 |
| WO | 9203869 A1 | 3/1992 |
| WO | 03031018 A1 | 4/2003 |

OTHER PUBLICATIONS

Written Opinion; PCT/KR2006/00498; May 10, 2006.

* cited by examiner

AUTO MANAGEMENT SYSTEM FOR AIR FILTER USED IN BATTERY PACK AND AUTO MANAGEMENT METHOD FOR THE SAME

TECHNICAL FIELD

The invention relates to an auto management system for an air filter used in a battery pack and an auto management method for the same, and more particularly to an auto management system for an air filter used in a battery pack and an auto management method for the same wherein a flux sensor connected to a battery management system (BMS) is provided around an air inlet or air outlet of the battery pack, a flux of air is detected with the flux sensor to notify an operator or user of replacement time of an air filter of the battery pack or whether the filter is equipped or not in advance, thereby preventing degradation or reduction in lifetime of the battery pack in advance and enabling a blowing fan to be effectively controlled so that the battery pack is always maintained within a normal temperature range during the operation.

BACKGROUND ART

In general, in a hybrid electric vehicle (HEV) adopting a cell in an internal combustion engine as a partial driving source or an electric vehicle (EV) using a cell as a main driving source, performance of the vehicles depends on how the cell is maintained under optimal conditions to produce a maximum output.

For example, as shown in FIG. 1, a conventional air conditioning device 1 for a battery pack comprises: a battery pack 5 consisting of a plurality of cells (not shown) and a case 4 accommodating each of the cells so that there is secured an air flow passage between the neighboring cells and having an air inlet 2 at one side thereof and an air outlet 3 at the other side thereof; an air filter 6 detachably mounted around the air inlet 2; a blowing fan 7 provided to the air outlet 3; a temperature sensor 8 arranged around the air inlet 2 and detecting heat generated from the battery pack 5; and a control unit (such as BMS) 9 connected to the cells of the battery pack 5, the blowing fan 7 and the temperature sensor 8, respectively, measuring currents, voltages and temperatures of the respective cells and electrically controlling the blowing fan 7 and the temperature sensor 8.

The control unit 9 detects the heat generated from the battery pack 5 through the temperature sensor 8 when the battery pack 5 is discharged or charged. At this time, when the heat generated from the battery pack is within a normal temperature range, the control unit continues to control the blowing fan 7 under corresponding operating mode as it is, and when the heat is out of the normal temperature range, it increases/decreases the output of the blowing fan 7 so that the temperature of the battery pack 5 reaches the normal range.

However, according to the prior art, since there is provided only the temperature sensor connected to the control unit in the air inlet, it is impossible to precisely detect the non-mounted state or replacement time of the air filter. Accordingly, even though a lot of dusts are adhered to the air filter, an operator or user cannot perceive such situations in advance, so that there occurs degradation or reduction in lifetime of the battery pack.

DISCLOSURE OF THE INVENTION

Technical Problem

Accordingly, the invention has been made to solve the above problems. An object of the invention is to provide an auto management system for a battery pack capable of notifying an operator or user of replacement time or non-mounted state of an air filter used in the battery pack to quickly cope with the situations, thereby preventing degradation or reduction in lifetime of the battery pack in advance.

Another object of the invention is to provide an auto management method for a battery pack capable of notifying an operator or user of replacement time or non-mounted state of an air filter used in the battery pack to quickly cope with the situations, thereby maintaining a temperature of the battery pack under optimal state and preventing degradation or reduction in lifetime of the battery pack in advance.

Technical Solution

In order to achieve the above objects, there is provided an auto management system for an air filter used in a battery pack having at least one cell and a case accommodating each of the cells so that there is secured an air flow passage between the neighboring cells and provided with an air inlet at one side thereof and an air outlet at the other side thereof, the system comprising: an air filter detachably mounted at an outside end of the air inlet of the case; a blowing fan provided to one of the air inlet and the air outlet; a flux sensor arranged at the other of the air inlet and the air outlet and detecting an air flow introduced into the case or discharged from the case; a control unit (such as BMS) connected to the cells of the battery pack, the blowing fan and the flux sensor, respectively, measuring currents, voltages and temperatures of the respective cells and electrically controlling the blowing fan and the flux sensor; and a notifying means connected to the control unit and notifying an operator or user of a non-mounted state or replacement time of the air filter.

According to another aspect of the invention, there is provided an auto management method for an air filter used in a battery pack, the method comprising steps of: operating a blowing fan; detecting a flux of air with a flux sensor; determining which of filter replacement range, normal filter operating range and filter non-mounted range information the detected flux belongs to, the information being standardized and stored in a memory of a control unit (such as BMS) in advance with respect to the flowing fan; and notifying an operator or user of the corresponding information through a notifying means when the detected flux belongs to the filter replacement range or filter non-mounted range as a result of the determination.

BRIEF DESCRIPTION OF THE DRAWINGS

The above and other objects, features and advantages of the present invention will be more apparent from the following detailed description taken in conjunction with the accompanying drawings, in which.

BEST MODE FOR CARRYING OUT THE INVENTION

Hereinafter, a preferred embodiment of the present invention will be described with reference to the accompanying drawings. In the following description of the present invention, a detailed description of known functions and configurations incorporated herein will be omitted when it may make the subject matter of the present invention rather unclear.

Figure 1:
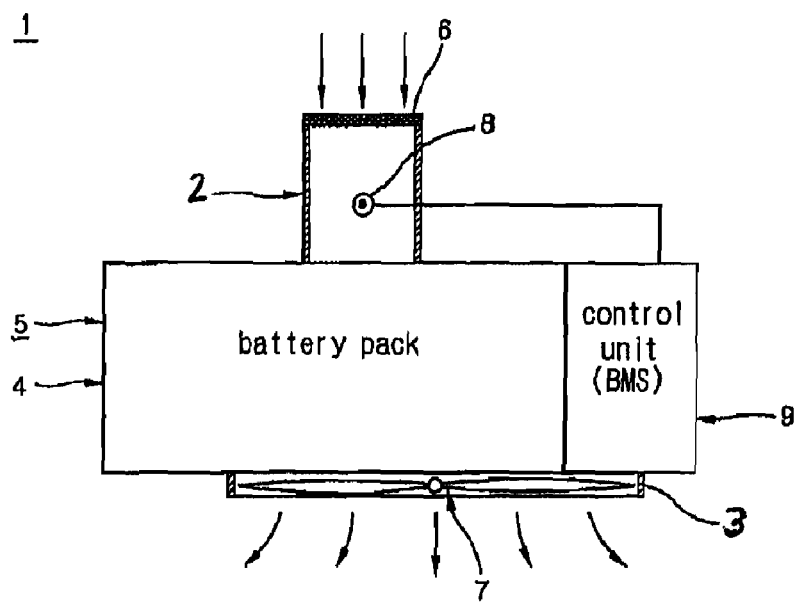
FIG. 1 is a schematic view of an air conditioning device for a battery pack according to the prior art.
Figure 2:
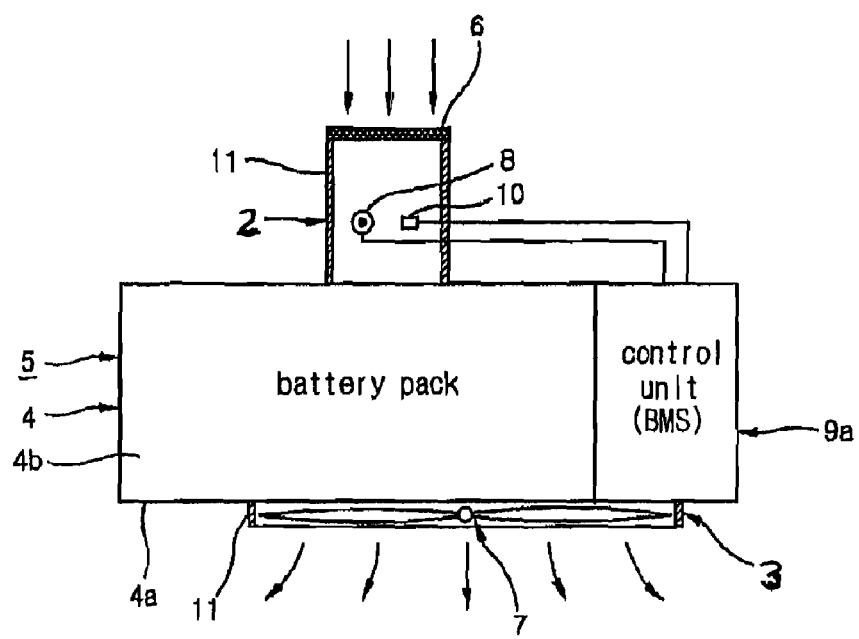
FIG. 2 is a schematic view of an auto management system for an air filter used in a battery pack according to an embodiment of the invention.

FIG. 2 is a schematic view of an auto management system for an air filter used in a battery pack according to an embodiment of the invention.

According to an embodiment of the invention, there is provided an auto management system for an air filter used in a battery pack 5 having at least one cell (not shown) and a case 4 accommodating each of the cells so that there is secured an air flow passage between the neighboring cells and provided with an air inlet 2 at one side thereof and an air outlet 3 at the other side thereof. The system comprises an air filter 6 detachably mounted at an outside end of the air inlet 2 of the case 4; a blowing fan 7 provided to one of the air inlet 2 and the air outlet 3; a flux sensor 10 arranged at the other of the air inlet 2 and the air outlet 3 and detecting an air flow introduced into the case 4 or discharged from the case; a control unit (such as BMS) 9a connected to the cells (not shown) of the battery pack, the blowing fan 7 and the flux sensor 10, respectively, measuring currents, voltages and temperatures of the respective cells and electrically controlling the blowing fan 7 and the flux sensor 10; and a notifying means (not shown) connected to the control unit and notifying an operator or user of a non-mounted state or replacement time of the air filter 6.

Preferably, the case 4 comprises a main body 4a accommodating the cells and a cover 4b protecting the cells in the main body 4a from an exterior environment.

In addition, it is preferred that the air inlet 2 is provided to one of the main body 4a and the cover 4b of the case 4, the air outlet 3 is provided to the other and the flux sensor 10 is mounted at one of the air inlet 2 and the air outlet 3 to which the blowing fan 7 is not equipped.

Further, the notifying means may be a display lamp or speaker. In case of a vehicle, it is preferred that the display lamp is provided to a dashboard on a driver side and a speaker provided in the vehicle is used as the speaker.

A temperature sensor 8 electrically connected to the control unit 9a may be further arranged adjacent to the flux sensor 10.

The air inlet 2 and the air outlet 3 of the case 4 may consist of a separate duct 11, or alternatively, may be formed to protrude from the corresponding wall surface of the case in a molding manner.

Figure 3:
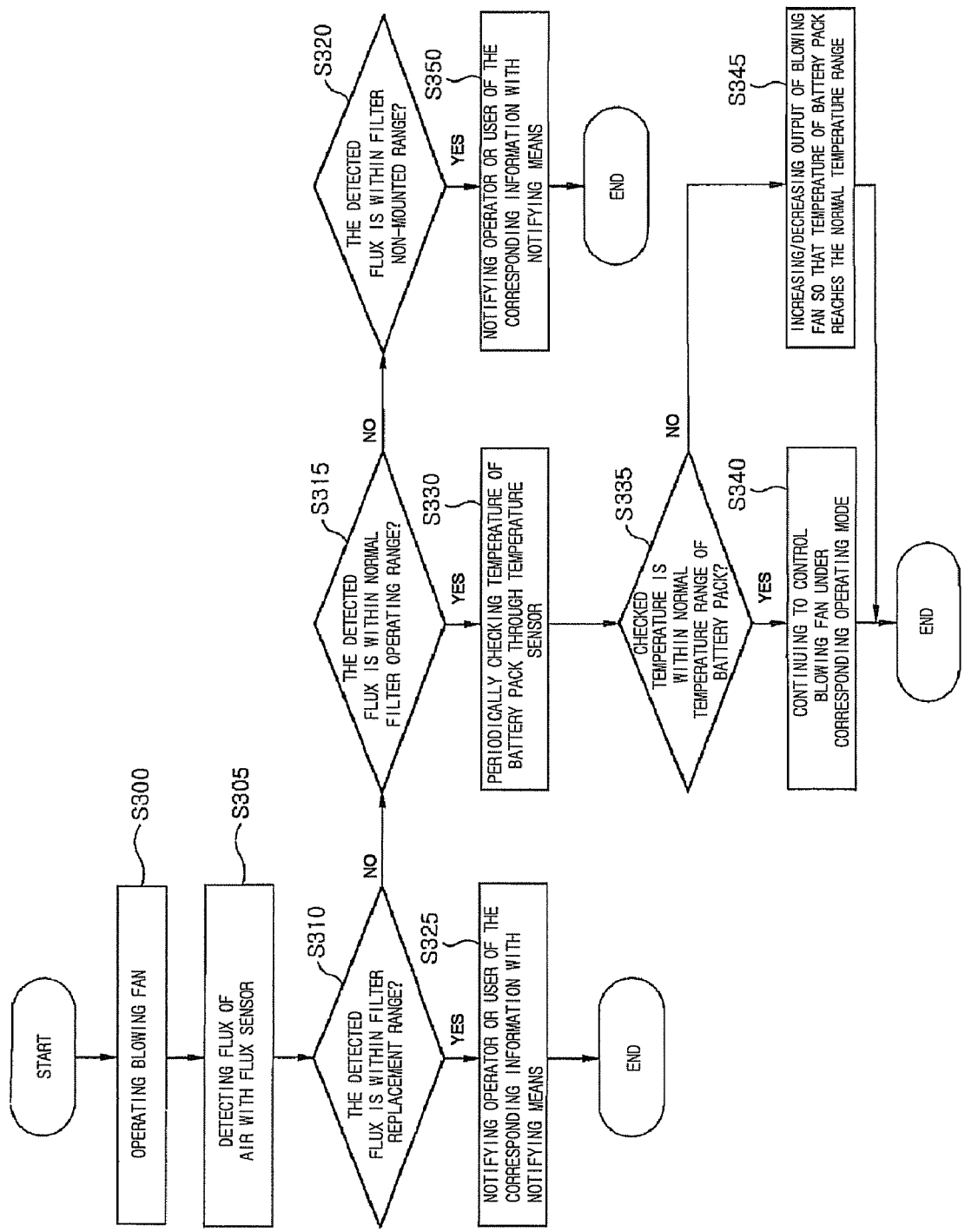
FIG. 3 is a flow chart showing an auto management method for an air filter used in a battery pack according to an embodiment of the invention.

Hereinafter, it is described an auto management method of the auto management system for an air filter used in a battery pack having a structure as described above, with reference to FIG. 3.

First, the control unit (such as BMS) 9a operates the blowing fan 7 to detect a flux of air with the flux sensor 10 (steps 300 and 305).

Subsequently, it is determined which of filter replacement range, normal filter operating range and filter non-mounted range information the flux detected in the step 305 belongs to, which the information is standardized and stored in a memory of the control unit 9a in advance with respect to the flowing fan 7 (steps 310, 315 and 320).

As a result of the determination, when it is determined that the detected flux belongs to the filter replacement range or filter non-mounted range, the corresponding information is notified to an operator or user through the notifying means (steps 325 or 350).

Continuously, as a result of the determination, when it is determined that the detected flux belongs to the normal filter operating range, a temperature of the battery pack 5 is periodically checked through the temperature sensor 8 (step 330).

Next, it is determined whether the checked temperature is within a normal temperature range of the battery pack 5 which is stored in the memory in advance (step 335).

Subsequently, as a result of the determination in the step 335, when it is determined that the temperature of the battery pack 5 is within the normal temperature range, the control unit continues to control the blowing fan 7 under corresponding operating mode as it is (step 340).

In the mean time, as a result of the determination in the step 335, when it is determined that the temperature of the battery pack 5 is out of the normal temperature range, the control unit increase/decreases the output of the blowing fan 7 so that the temperature of the battery pack reaches the normal range (step 345).

As described above, according to the invention, it is possible to notify an operator or user of the replacement time or non-mounted state of the air filter used in the battery pack to quickly cope with the situations, thereby maintaining the temperature of the battery pack under optimal state and preventing degradation or reduction in lifetime of the battery pack in advance.

While the invention has been shown and described with reference to certain preferred embodiments thereof, it will be understood by those skilled in the art that various changes in form and details may be made therein without departing from the spirit and scope of the invention as defined by the appended claims.

The invention claimed is:

1. An auto management system for an air filter used in a battery pack having at least one cell and a case accommodating each of the cells so that there is secured an air flow passage between the neighboring cells and provided with an air inlet at one side thereof and an air outlet at the other side thereof, the system comprising:
   an air filter detachably mounted outside the case housing of the battery pack at the air inlet;
   a blowing fan provided to one of the air inlet and the air outlet;
   a flux sensor mounted at one of the air inlet and the air outlet to which the blowing fan is not equipped and detecting an air flow introduced into the case or discharged from the case;
   a control unit connected to the cells of the battery pack, the blowing fan and the flux sensor, respectively, measuring currents, voltages and temperatures of the respective cells and electrically controlling the blowing fan and the flux sensor; and
   a notifying means connected to the control unit and notifying an operator or user of a non-mounted state or replacement time of the air filter, wherein the auto management system further comprises a temperature sensor electrically connected to the control unit and arranged adjacent to the flux sensor, and
wherein the air inlet is provided to one of the main body and the cover of the case.

2. The auto management system according to claim 1, wherein the case comprises a main body accommodating the cells and a cover protecting the cells in the main body from an exterior environment.

3. The auto management system according to claim 1, wherein the notifying means is a display lamp or speaker.

4. The auto management system according to claim 1, wherein the air inlet and the air outlet of the case consist of a duct.

5. An auto management method for an air filter used in a battery pack, the method comprising steps of:
   operating a blowing fan;

detecting a flux of air with a flux sensor;
determining which of filter replacement range, normal filter operating range and filter non-mounted range information the detected flux belongs to, the information being standardized and stored in a memory of a control unit in advance with respect to the flowing fan;
notifying an operator or user of the corresponding information through a notifying means when the detected flux belongs to the filter replacement range or filter non-mounted range as a result of the determination; and
periodically checking a temperature of the battery pack through a temperature sensor when it is determined that the detected flux belongs to the normal filter operating range, as a result of the determination.

6. The auto management method according to claim 5, further comprising a step of determining whether the checked temperature is within a normal temperature range of the battery pack which is stored in the memory in advance.

7. The auto management method according to claim 6, wherein the blowing fan is continuously controlled under corresponding operating mode when it is determined that the temperature of the battery pack is within the normal temperature range, as a result of the determination.

8. The auto management method according to claim 6, wherein the output of the blowing fan is increased/decreased so that the temperature of the battery pack reaches the normal range when it is determined that the temperature of the battery pack is out of the normal temperature range, as a result of the determination.

* * * * *